United States Patent [19]

Brown

[11] 4,309,043
[45] Jan. 5, 1982

[54] DRIVE SYSTEM FOR BICYCLES AND OTHER APPARATUS

[76] Inventor: Lawrence G. Brown, 1629 Kuhilani St., Honolulu, Hi. 96821

[21] Appl. No.: 89,503

[22] Filed: Oct. 30, 1979

Related U.S. Application Data

[63] Continuation-in-part of Ser. No. 6,055,017, Jul. 5, 1979.

[51] Int. Cl.³ .............................................. F16H 29/04
[52] U.S. Cl. ................................. 280/236; 74/594.2; 74/594.3; 74/781 B; 474/71
[58] Field of Search ............... 280/259, 236, 260, 261, 280/262; 74/594.3, 594.2, 594.1, 804, 803, 36, 437, 243 NC, 781 B; 474/69, 72

[56] References Cited

U.S. PATENT DOCUMENTS 2,690,083  9/1954  Iseman ................................... 474/72
4,133,550  1/1979  Brown ................................ 280/210

FOREIGN PATENT DOCUMENTS 379 of 1898  United Kingdom ................ 280/236

*Primary Examiner*—Richard A. Bertsch
*Assistant Examiner*—Randall A. Schrecengost
*Attorney, Agent, or Firm*—Bruce G. Klaas

[57] ABSTRACT

An input-output force correlated drive system for driving any driven device such as the rear wheel of a bicycle, a flywheel, or the like comprising: input force applying apparatus for transmitting input force to and causing operation of the drive system; rotatable output force transfer apparatus operable by the input force applying apparatus for transferring output force to the driven device; and input-output force correlation apparatus being continuously operatively connectable to and operable by the input force applying apparatus and being continuously operatively connectable to and operating the output force transfer apparatus for variably changing the rotational speed and circumferential location of the output force transfer apparatus relative to the input force applying apparatus during each revolution in accordance with predetermined input-output force correlation characteristics to be provided by the drive system.

28 Claims, 19 Drawing Figures

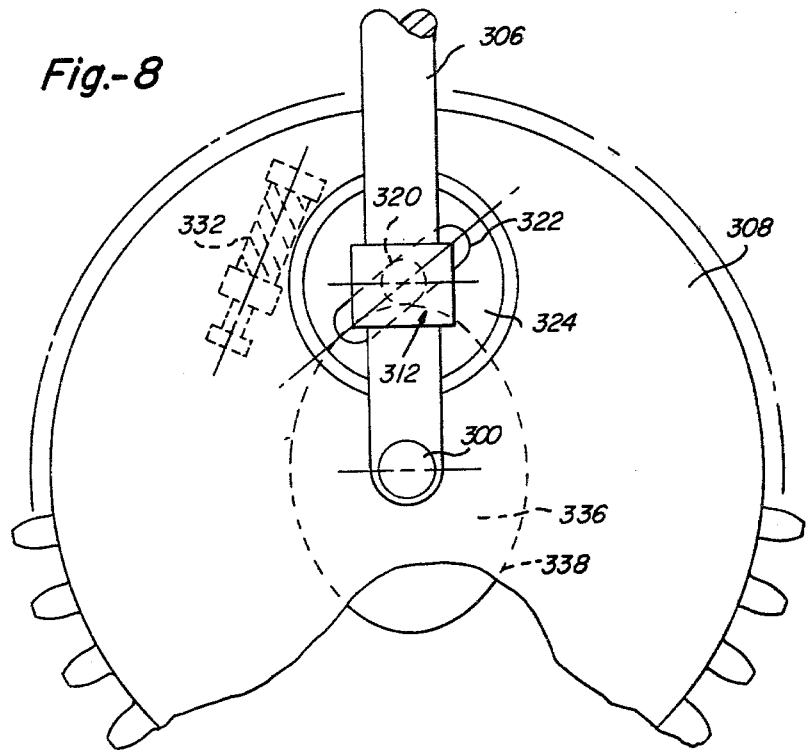
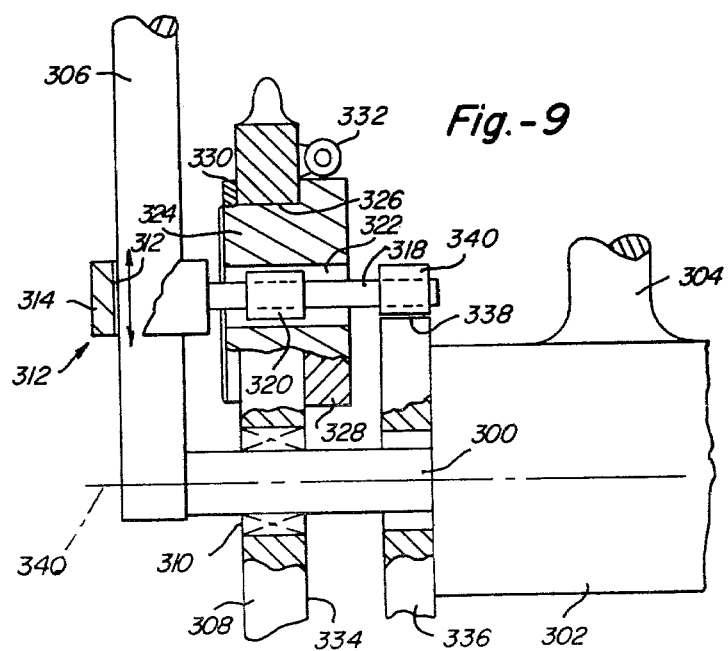

4,309,043

DRIVE SYSTEM FOR BICYCLES AND OTHER APPARATUS

This application is a continuation-in-part of my pending U.S. patent application, Ser. No. 06/055,017 filed July 5, 1979, and is related to my prior U.S. Pat. No. 4,133,550, the disclosures of which are specifically incorporated herein by reference.

BACKGROUND AND SUMMARY OF INVENTION

This invention relates to drive systems for bicycles and other devices of the type wherein input force is varied during transmittal to a rotary output device to produce an output force of varying magnitude which is variously applied to the rotary output device during each revolution thereof.

As disclosed in my prior patent, it is advantageous to provide a drive system for a bicycle, or any other rotary power transmission apparatus, which has input-output force correlation means operably connected to and operable by input force means for correlating input force applied to the input force means with output force delivered to the rear wheel, or any other driven device, during the power input cycle while continuously maintaining the application of output force to the rear wheel throughout each power input cycle. In such a system, the apparatus is constructed and arranged for varyingly applying input force during repetitive power input cycles of a rotary or reciprocating input system of a bicycle or the like operatively connected to a rotary output system of a bicycle in which the input system is subject to varying magnitude and direction of application of input force and varying effective resistance of the output system during each power input cycle; varying the magnitude and direction of the transmitted input force during each power input cycle by continuously varying the effective radial and circumferential location of application of the transmitted input force in accordance with the varying effective resistance characteristics encountered by the input system; and continuously maintaining the application of the transmitted input force to the rotary output system throughout each power input cycle. In such a system, maximum transmitted input force may be generated at those circumferential locations of the application of input force to the system at which the effective input force is minimal, or maximum transmitted input force may be generated at those circumferential locations of the application of input force to the input system at which the effective input force is maximal. The variations in magnitude and direction of the transmitted input force are selected in accordance with predetermined desired variations of the input force which may be based upon varying capabilities of bicycle riders. In such a system, the rear wheel position is varied relative to the pedal position during each 360° input force application cycle so that the effective resistance of the rear wheel to rotation is variably transferred to the pedals in a predetermined manner. The amount of input force required to overcome the effective resistance of the rear wheel to rotation at each rear wheel position during each 360° input force application cycle is reduced while varying the rear wheel position relative to the pedal position during each 360° input force application cycle so that the effective resistance of the rear wheel to rotation is variably transferred to the pedals during each 350° input force application cycle in a predetermined manner. The effective resistance of the rear wheel to rotation may be varied in accordance with and relative to pedal positions so as to variously match the maximum input force capability of the rider with the resistance to rotation of the rear wheel or to variously match the maximum input force capability of the rider with the maximum effective resistance of the rear wheel to rotation. Such system requires substantially less pedal input force to overcome a given resistance. It may be designed to effect the magnitude of the applied input force relative to output resistance or the magnitude of output torque for a given input force at particular pedal-wheel positions during each revolution.

In general, the drive system of the present invention provides similar results and comprises: input force applying means for applying force to the drive system; rotatable output force transfer means for transferring output force to any driven device such as the rear wheel of the bicycle; mounting means for rotatably mounting said rotatable output force transfer means and enabling rotation thereof relative to the mounting means in both forward and rearward directions; input force transfer means for transferring input force from the input force applying means to the rotatable output force transfer means to cause rotation thereof in the forward direction and transfer of output force to the rear wheel; input-output force correlation means operatively associated with the input force transfer means for correlating input-output forces by forward and rearward relative rotative displacement of the rotatable output force transfer means and the input force transfer means during each revolution of the drive system.

The input-output force correlation means comprises cam means mounted in juxtaposition to and operative relationship with the rotatable output force transfer means and the input force transfer means for controlling the amount and location of the relative rotative displacement therebetween during each revolution of the drive system.

The cam means comprises a cam track having a continuous cam surface extending 360° about the axis of rotation of the rotatable output force transfer means; and cam follower means movably mounted on the cam surface on the cam track for continuous movement therearound during each revolution of the drive system.

The input-output force correlating means further comprises oscillator means operatively connected to the cam follower means and to the rotatable output force transfer means for causing relative rotative displacement of the rotatable output force transfer means. The oscillator means may be pivotally or axially displaceable by the cam means. The oscillator means may be directly connected to the output force transfer means or may be indirectly connected thereto through gear means such as a planetary gear system. An inclined slot means, with a cam driven roller means mounted therein, may be fixedly or adjustably associated with the output force transfer means for modifying the effect of the cam means on the output force transfer means.

In use as a drive system for a bicycle or the like, the drive system connects the pedal operated crank arms to a rotatable sprocket wheel mounted coaxially with a rotatable crank shaft driven by the pedal operated crank arms. The sprocket wheel is rotatably mounted on the crank shaft which is rotatably supported in the conventional crank shaft housing mounted on the bicycle frame. The cam means is in the form of a plate fixedly mounted on the crank shaft housing circumjacent and axially adjacent one end of the crank shaft so that the cam surface extends thereabout. The oscillator means is mounted between the sprocket wheel and the plate in closely spaced axial relationship therewith. Thus, the drive system of the present invention may be readily adapted for use with other conventional drive system apparatus of otherwise conventional bicycles while providing the advantageous results described herein and in my prior patent.

BRIEF DESCRIPTION OF DRAWING

Illustrative and presently preferred embodiments of the invention are shown on the accompanying drawing in which:

FIG. 8 is a schematic side elevational view of a sixth embodiment of the invention;

FIG. 9 is another side elevational view, partly in cross-section, of the apparatus of FIG. 8;

FIRST EMBODIMENT

Figure 1:
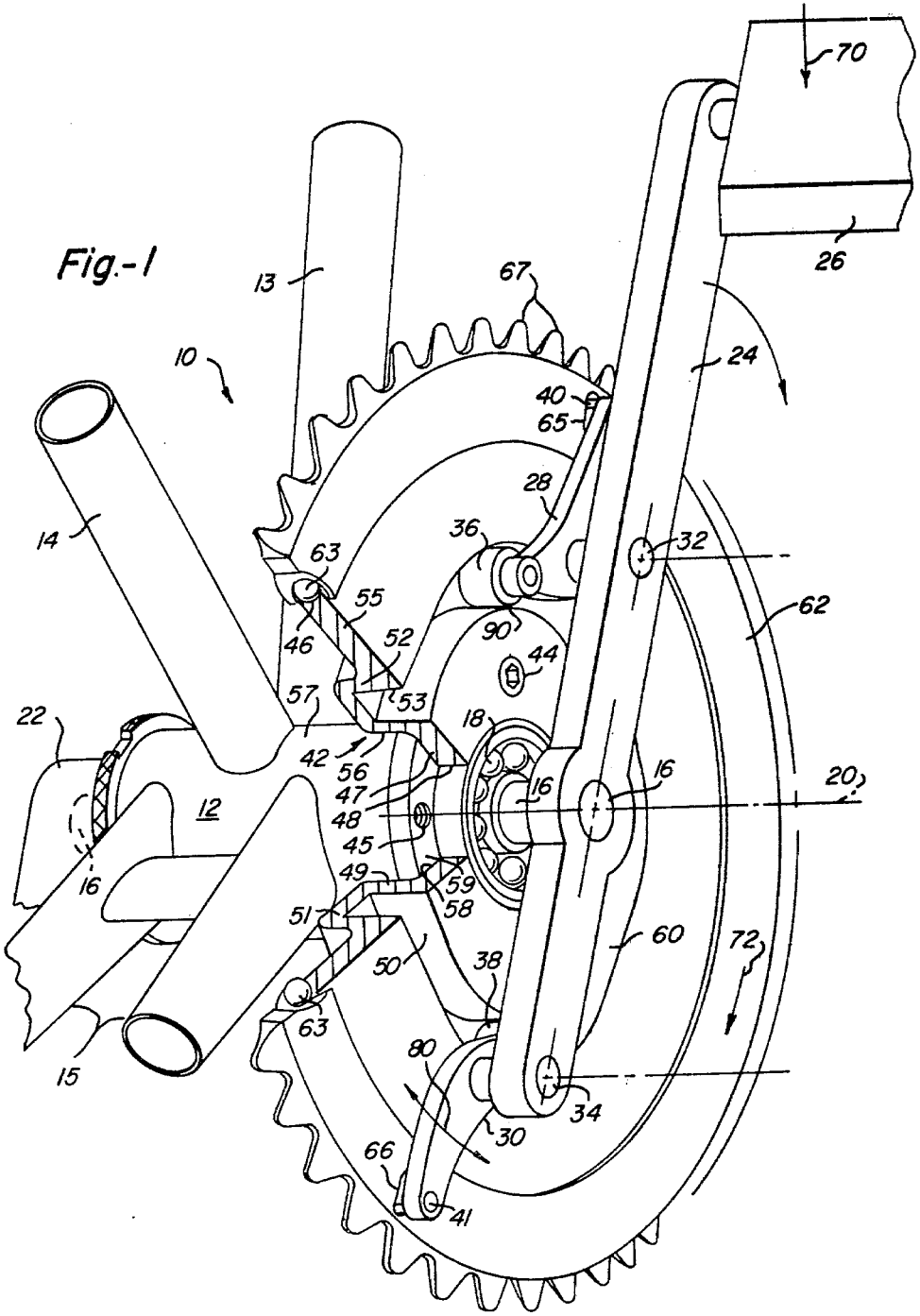
FIG. 1 is a schematic perspective view of a first embodiment as mounted on a bicycle.
Figure 2:
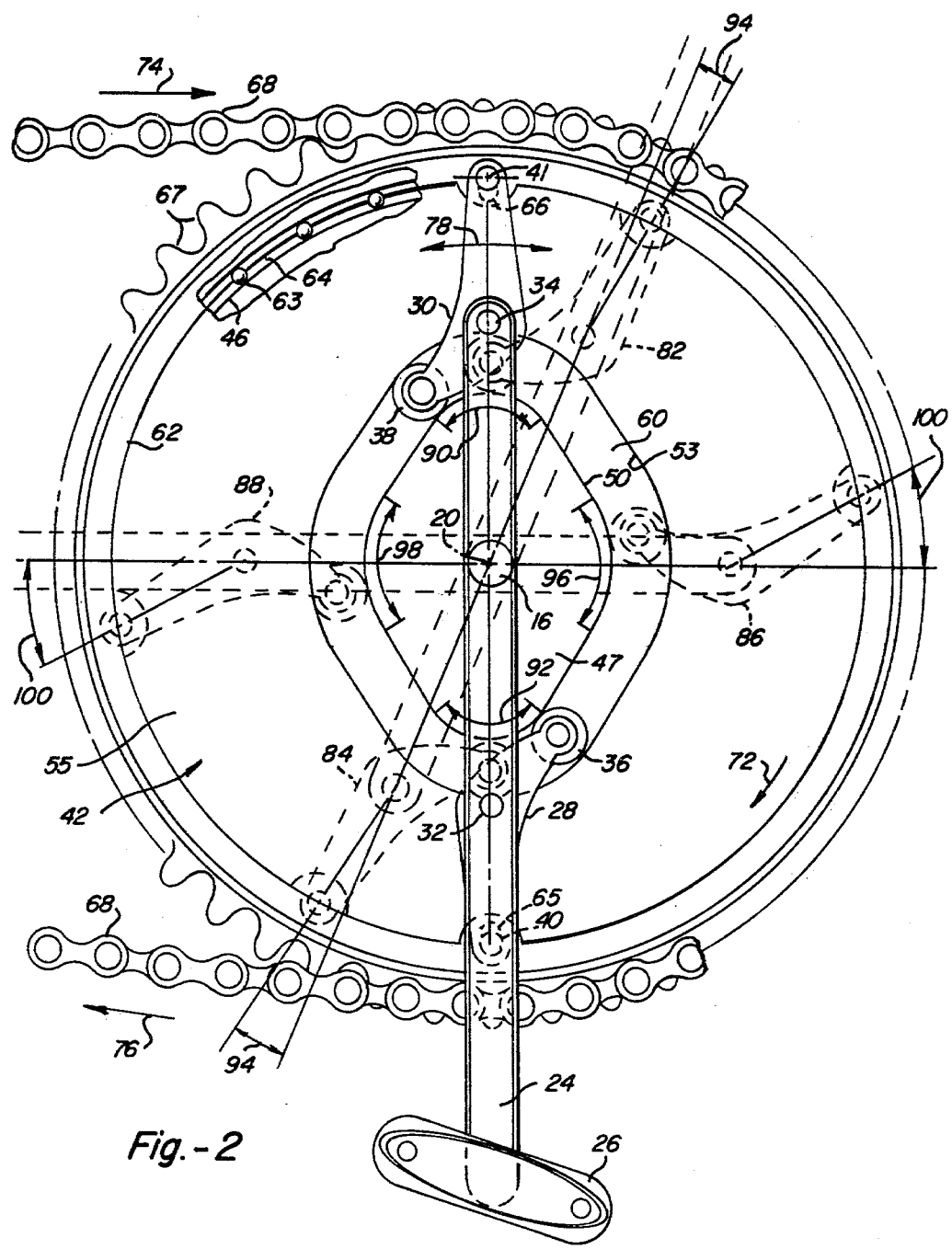
FIG. 2 is an enlarged schematic side elevational view of a portion of the apparatus of FIG. 2.

In the embodiment of FIGS. 1 & 2 the drive system of the present invention is shown in association with a portion of a bicycle 10 having a crank hub 12 fixedly attached to frame portions 13, 14, 15 in a conventional manner. A crank shaft 16 is rotatably mounted in hub 12 by suitable bearing means (not shown) in the hub 12 and a bearing means assembly 18 outside the hub to provide a central axis of rotation 20. A pair of crank arm members 22, 24 are fixed to opposite end portions of crank shaft 16 and extend radially outwardly therefrom in opposite directions in 180° spaced relationship. A pedal 26 is associated with each crank arm. One of the crank arms 24 has a pair of oscillator means in the form of lever members 28, 30 pivotally attached thereto by pivot pins 32, 34 located equal radial distances outwardly of central axis 20. Each lever member carries a cam follower roller member 36, 38 on a radially innermost end portion and a pin member 40, 41 on a radially outermost end portion.

An annular mounting means in the form of a plate member 42 is fixedly removably mounted on one end of hub 12 axially adjacent crank arm 24 by suitable threaded mounting means 44, 45. Plate member 42 comprises an annular outermost peripheral surface 46; a radially innermost radially extending portion 47 having a central bore 48 which mounts bearing assembly 18; an axially inwardly extending portion 49 having an axially inwardly extending radially outermost peripheral contoured cam surface 50; a radially intermediate radially outwardly extending portion 51 which is axially inwardly offset relative to portion 47; a radially intermediate axially outwardly extending portion 52 connected to portion 51 having an axially outwardly extending contoured cam surface 53 which is located in radially outwardly spaced parallel relationship to cam surface 50; and a radially outermost radially outwardly extending portion 55 located in parallel coplanar axial alignment with the radially innermost portion 47 and bearing assembly 18. Axially inwardly extending inner peripheral surface 56 may be supported on the outer peripheral surface 57 of hub 12 and radially extending axially inner surface 58 is supported on end surface 59 of the hub. A cam track means 60 is thus provided by the symmetrical oppositely facing cam surfaces 50, 53 in plate member 42 for receiving cam follower roller members 36, 38 in axially alignment with bearing assembly 18.

Rotatable output force transfer means in the form of an annular sprocket ring member 62 is rotatably mounted on the outer periphery of plate member 42 by suitable mounting means such as ball bearing members 63 of a ball bearing assembly 64, FIG. 2. Circumferentially opposite radially extending elongated slots 65, 66 in the side wall of ring member 62 slidably receive the pin members 40, 41. Sprocket teeth 67 are provided on the outer periphery of ring member 62 to receive a conventional continuous loop drive chain member 68, FIG. 2, which drives a conventional one speed sprocket wheel or a stack of multiple speed sprocket wheels associated with the rear wheel of the bicycle.

In operation of the apparatus of FIGS. 1 & 2 input force is applied to the input force applying means, in the form of pedal 26, in the direction of arrow 70 during each 180° downward power stroke of each revolution from the uppermost 0° pedal position to the lowermost 180° pedal position. Input force is similarly applied to the other pedal during the other half of each revolution. Shaft 16, crank arms 22, 24, pins 32, 34, oscillators 28, 30, and pins 40, 41 provide input force transfer means for transferring input force to the sprocket 62 to cause rotation in the direction of arrow 72 and movement of chain 68 in the direction of arrows 74, 76, FIG. 2. As crank arm 24 is rotated, it carries the oscillators 28, 30 in a circular path about central axis 20 with cam followers 36, 38 moving along the cam track 60 to cause continuous equal pivotal displacement of the oscillators about pins 32, 34 as indicated by arrows 78, 80. The pivotal oscillation of the oscillators causes circumferential forward and rearward displacement of sprocket 62 relative to plate 42 and relative to the crank arms 22, 24, as illustrated in phantom in FIG. 2 at 82, 84 and 86, 88, respectively, so as to uniformly change the pedal positions relative to the sprocket during each revolution whereby to provide input-output force correlating means as described in my prior patent. Slots 65, 66 enable the pivotal oscillating movement and circumferential displacement of the sprocket. The symmetrical non-circular contour of the cam track 60 controls the amount and location of the circumferential displacement and is chosen in accordance with predetermined desired input-output force correlation characteristics to be provided in the drive system for particular persons, e.g. men, women or children, and purposes, e.g. racing, touring, transportation, exercise, etc., as described in my prior patent.

With the illustrative contour of FIG. 2, the sprocket 62 is advanced as illustrated in the illustrative embodiment of FIG. 2, at the 0° and 180° pedal-crank arm positions, the centerlines of the crank arms 22, 24 and the sprocket drive pins 40, 41 are radially aligned so that the relative circumferential displacement between the sprocket and the crank arms is 0°. As the crank arms move beyond the 0° and 180° pedal-crank arm positions, maximum advancement is provided along the cam surface portions 90, 92 as indicated by positive lead angle 94. Maximum retardation is provided by cam surface portions 96, 98 at the 90° and 270° pedal positions as indicated by negative lag angles 100. Thus, the effective input force may be variously matched with the effective resistance so as to enable more effective power utilization, ie. provide higher efficiency. This feature is particularly advantageous in use of the drive system in exercise programs for rehabilitation of persons who are physically handicapped because of a lesser input force requirement for equivalent work of a conventional drive system. The present system may be used with all presently available bicycles including the various 1, 3, 5 and 10 speed drive systems utilized therewith because the rearend of claim 68 can be associated with any type of rear wheel sprocket arrangement in any conventional manner. Also, the drive system may be easily mounted and removed to facilitate assembly, change of parts, maintenance and repair. The size of the system may be approximately the same as the size of conventional sprockets for a given gear ratio or of reduced size as hereinafter described. The system may be used on any kind of velocipede, stationary bicycle type exercise apparatus, motor driven apparatus, or the like.

Second Embodiment

Figure 3:
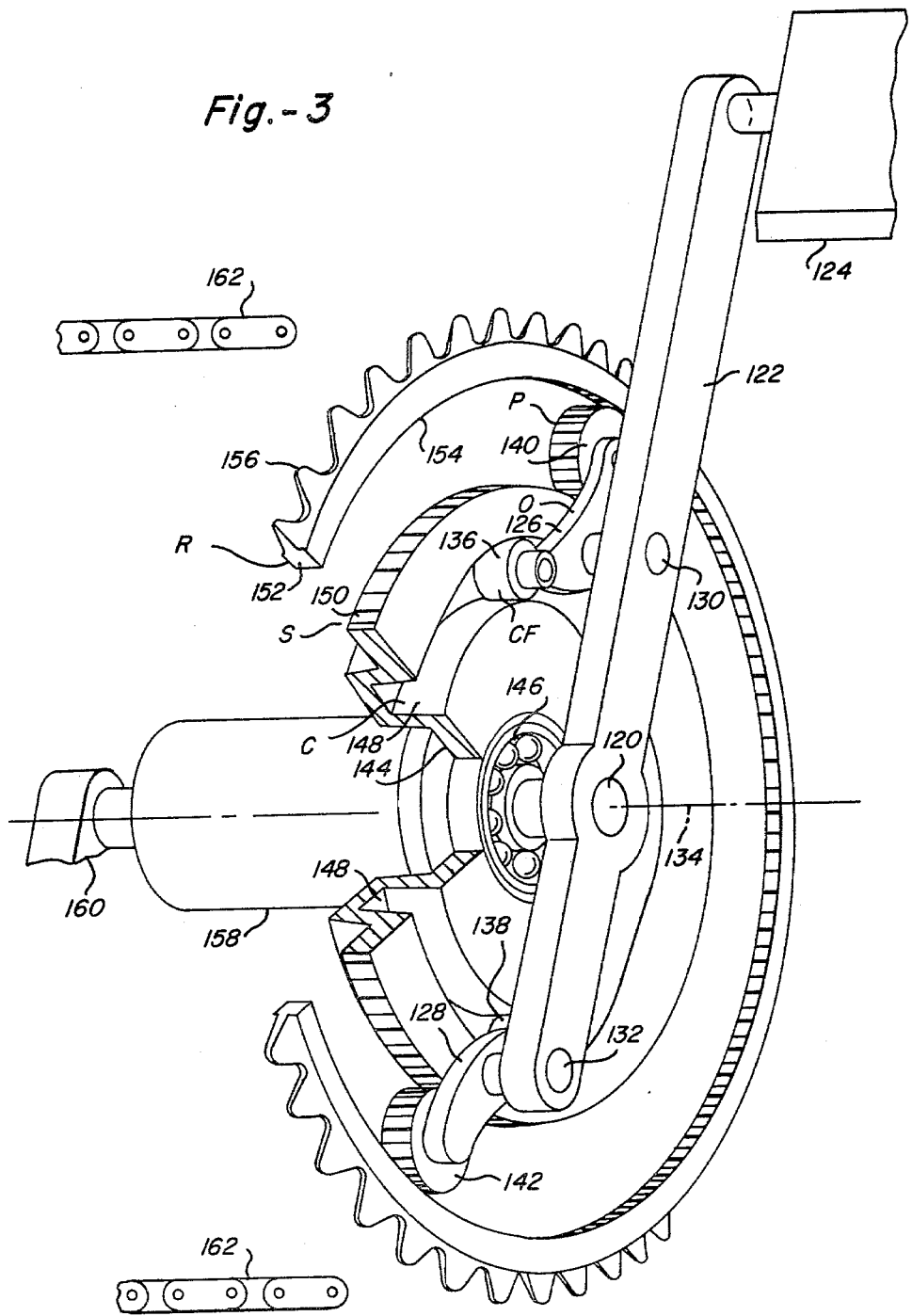
FIG. 3 is a schematic perspective view of a second embodiment as mounted on a bicycle.

In the embodiment of FIG. 3, a drive shaft means 120, such as a bicycle crank shaft, is rotatably driven by suitable input force applying means, such as one or more bicycle crank arm members 122 having a pedal 124 mounted on one end portion thereof. Oscillator means 126, 128 are pivotally attached to the crank arm 122 by pin means 130, 132 located equal radial distances from the axis of rotation 134 of the input force applying means. Cam follower roller means 136, 138 and planetary gear means 140, 142 are rotatably mounted on each oscillator means. An annular plate means 144 is fixedly mounted circumjacent shaft means 120 in juxtaposition to crank arm means 122 by any suitable mounting means (not shown). A cam track means 148 is provided in a radially intermediate portion of the annular plate means 144 and cam follower roller means 136, 138 are mounted therein at opposite 180° positions. The symmetrical non-circular contour of cam track means is chosen to provide predetermined input-output characteristics as described in my prior patent. Sun gear means 150 are provided on the periphery of annular plate means 144. A rotatable output force transfer means in the form of a ring member 152 is rotatably mounted in radially spaced circumjacent relationship to drive shaft means 120 and annular plate means 144 by any suitable axially confined mounting means (not shown). Planet gear means 140, 142 are mounted on oscillator means 130, 132 in opposed relationship to roller means 136, 138 between and in operative engagement with sun gear means 150 and a ring gear means 154 provided on the inner periphery of ring member 152. A chain sprocket means 156 is provided on the periphery of ring member 152 to receive and drive a chain 162 connected to the rear wheel of a bicycle. The gear ratios may be chosen to provide any desired input-output speed relationship; however, in usage in a bicycle drive system, it is desirable to provide an increase in the speed ratio of, for example, 2:1 or 3:1 so that the diameters of the parts may be relatively small to reduce size and space requirements.

In usage in a bicycle drive system, shaft means 120 is mounted in a conventional manner in the crank shaft hub 158 with a conventional pedal driven crank arm 160 mounted on one end of shaft 120 and with the drive system, including crank arm 122 mounted on the opposite end of shaft 120. A conventional continuous loop drive chain 162 is mounted on sprocket means 156 and extends rearwardly to the rear wheel whereat it is drivably associated with the rear wheel by any suitable conventional sprocket means including any conventional multiple speed system.

In operation, shaft means 120 is rotated by input force applied through the crank arms 120, 160. During rotation, oscillator means 130, 132 are carried by crank arm 120 along a circular path defined by the movement of pin means 130, 132. Planet gear means 140, 142 are carried by the oscillator means between and along a circular path defined by the sun gear means 150 and the ring gear means 154 to cause rotation of the ring member 152. The circumferential locations of planet gears 140, 142 relative to the crank arm 122 is continuously equally variably controlled by cam track means 148 through roller means 136, 138 and oscillator means 126, 128 which are pivotally displaceable relative to pin means 130, 132. Thus, the locations of the planet gears may be advanced or retarded relative to the crank arms 122, 160 to provide input-output force correlating means as described in my prior patent.

Third Embodiment

Figure 4:
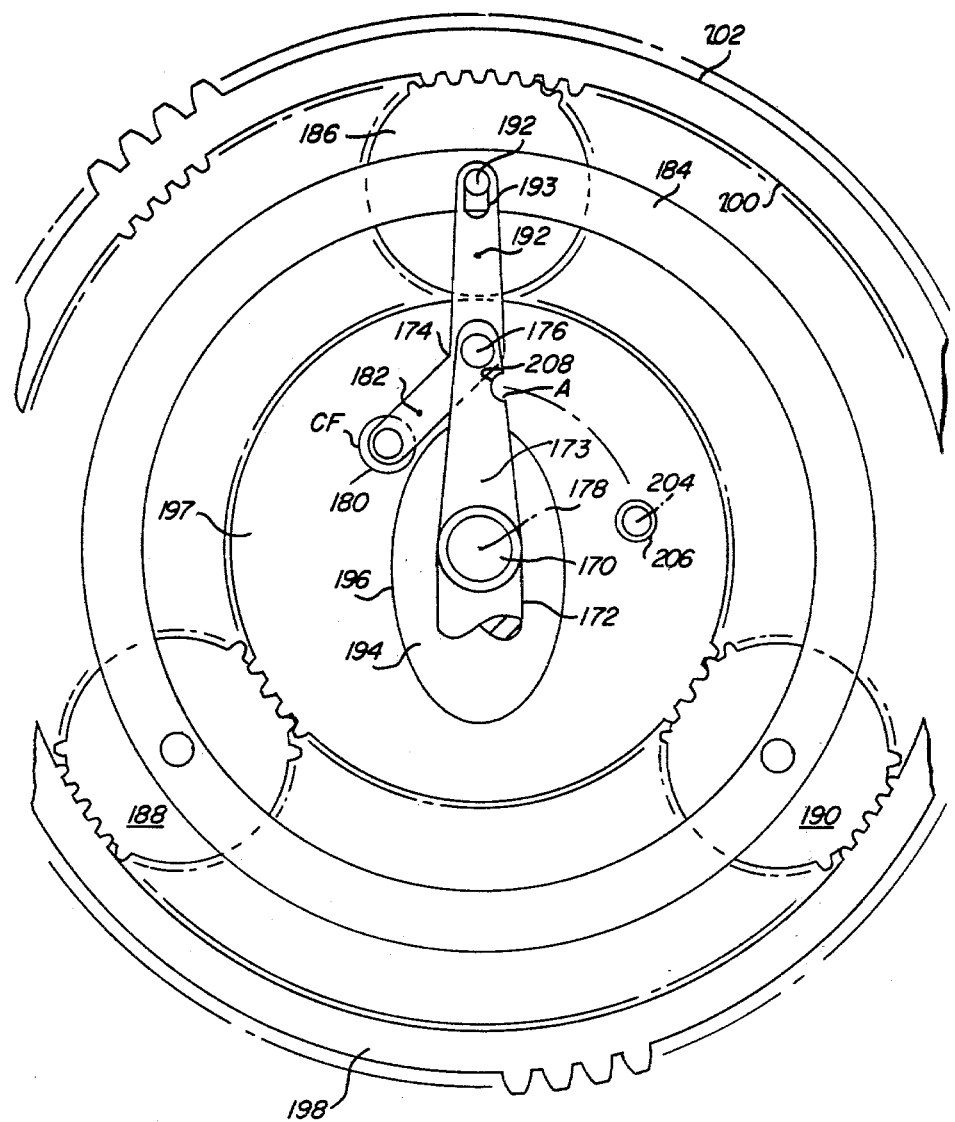
FIG. 4 is a schematic side elevational view of a third embodiment.

In the embodiment of FIG. 4, a rotatable drive shaft means 170, such as a bicycle crank shaft, is driven by suitable input force applying means 172, such as the pedal driven bicycle crank arms previously described, having an end portion 173. An oscillator means 174 is pivotally attached to crank end portion 173 by pin means 176 located radially outwardly of the axis of rotation 178 of the input foce applying means. A cam follower roller means 180 is mounted on one oscillator leg portion 182 and a planetary gear supporting ring 184, having planetary gears 186, 188, 190 mounted thereon, is connected to the other oscillator leg portion 191 by a pin 192 in slot 193. A cam means 194, having a symmetrically contoured cam surface 196, is fixedly mounted relative to shaft means 172 for continuous engagement with cam follower means 180. The contour of cam surface is chosen to provide any desired predetermined input-output force correlation as described in my prior patent. A sun gear means 197 is fixedly or rotatably mounted circumjacent drive shaft means 170 in axially offset relationship to cam means 194 and in axial alignment with planetary gear means 186, 188, 190 which are driveably engaged with teeth on the periphery thereof. A rotatable output force transfer means, in the form of a ring gear member 198, having internal teeth on inner surface 200 and external teeth on outer surface 202 is rotatably mounted in circumjacent driveable engagement with sun gear means 186, 188, 190 by any suitable axially confining mounting means (not shown). The gear ratios are chosen to provide any desired input-output speed relationship.

In use of the drive system, on a bicycle as previously described or any other apparatus, during rotation of crank arm means 172, oscillator means 174 is carried in a circular path while being variably pivotally displaced relative to arm portion 173 by cam follower means 180 in accordance with the contour of cam surface 196 to advance and retard the position of the plant gear means 186, 188, 190 by circumferential displacement of carrier ring means 184. In this manner, the relative circumferential positions of the ring gear means 198 and the drive shaft means 170 as well as the input force means 172 is continuously variable to provide desired input-output force correlation therebetween.

Figure 5:
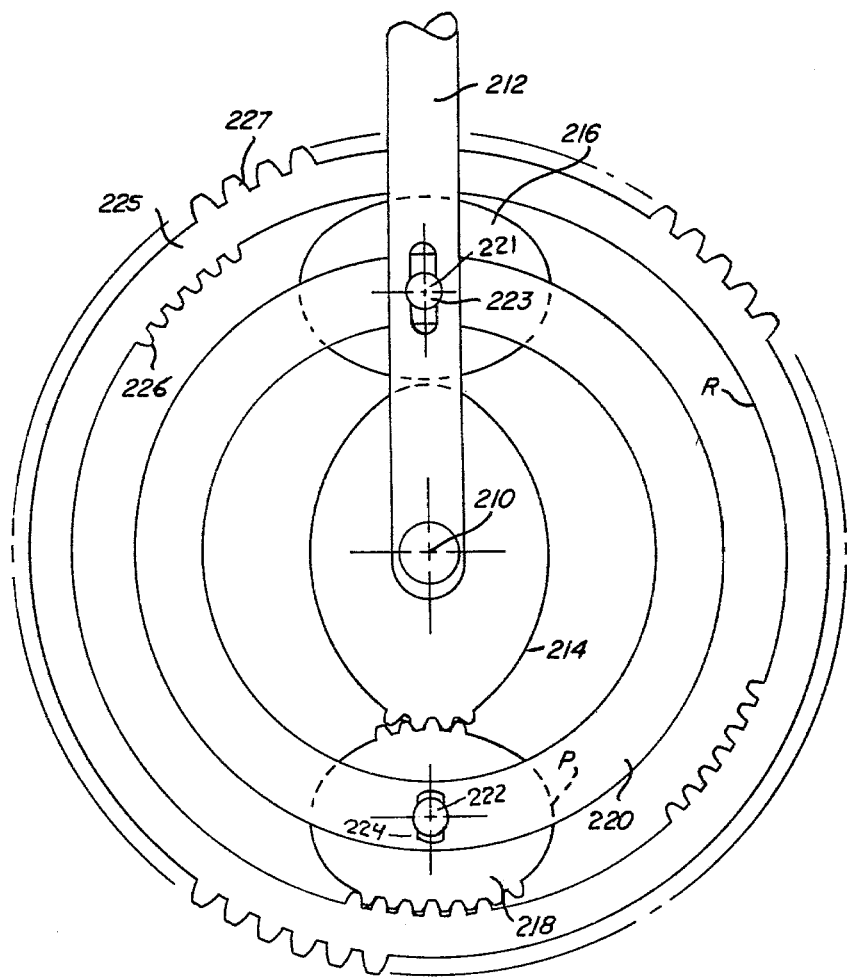
FIG. 5 is a schematic side elevational view of a fourth embodiment.

The planetary gear means systems of FIGS. 3-5 are readily adaptable to incorporation of speed change means by use of conventional methods such as selective restraint of one or more of a rotatable sun gear, the planet gears and/or the ring gear. For example, in the embodiment of FIG. 4, sun gear 197 may be rotatably mounted on shaft 170. An axially slidable pin 204 is suitably mounted for axial movement in a bore 206 in the sun gear between a holding position whereat one end portion of the pin 204 is located in bore 206 with the other end portion located in a fixed bore in the frame (not shown) to prevent rotation of the sun gear and an axially displaced driving position whereat the one end portion of the pin is located in the path of movement of crank arm 173 for engagement with a notched portion 208 with the other end portion located in sun gear bore 206 whereby the sun gear is rotated with the crank arm to change the gear ratio.

Fourth Embodiment

In the embodiment of FIG. 5, a rotatable drive shaft means 210 is driven by suitable input force applying means 212, such as the pedal driven bicycle crank arms previously described. A non-circular shaped sun gear means 214 is mounted on shaft means 210 in axially offset relationship to input force applying means 212. A pair of non-circular shaped planet gear means 216, 218 are mounted in 180° opposed relationship on a carrier ring means 220 and connected thereto by pin means 221, 222 associated with slot means 223 in arm 212 and 224 in carrier ring means 220, the pin means 221 being drivably connected to input force applying means 212. An output force means, in the form of a ring gear 225 having internal and external toothed surfaces 226, 227, is mounted circumjacent the planetary gear means 216, 218 and driven thereby. The shape and perimetral length of the non-circular sun gear means 214 is symmetrically matched with the shape and perimetral length of each of the non-circular planet gear means 216, 218 so as to provide identical resistance characteristics for both pedals of a bicycle drive system during each revolution of drive shaft means 210. The shape of the non-circular sun gear means 214, and the non-circular planetary gear means 216, 218 determine the amount of relative circumferential displacement between the ring gear means 225 and the drive shaft means 210 to establish desired input-output force correlation characteristics of the system.

In operation, during each revolution of the input force applying means 212 and drive shaft means 210, the sun gear means 216, 218 are carried about the axis of rotation of the drive shaft means. During each revolution of the input force applying means, the planetary gear means 216, 218 revolve about their axis of rotation and transmit input force to ring gear means 225 which is rotated thereby at varying speeds under varying loads to obtain desired input-output force correlation in the drive system.

Fifth Embodiment

Figure 6:
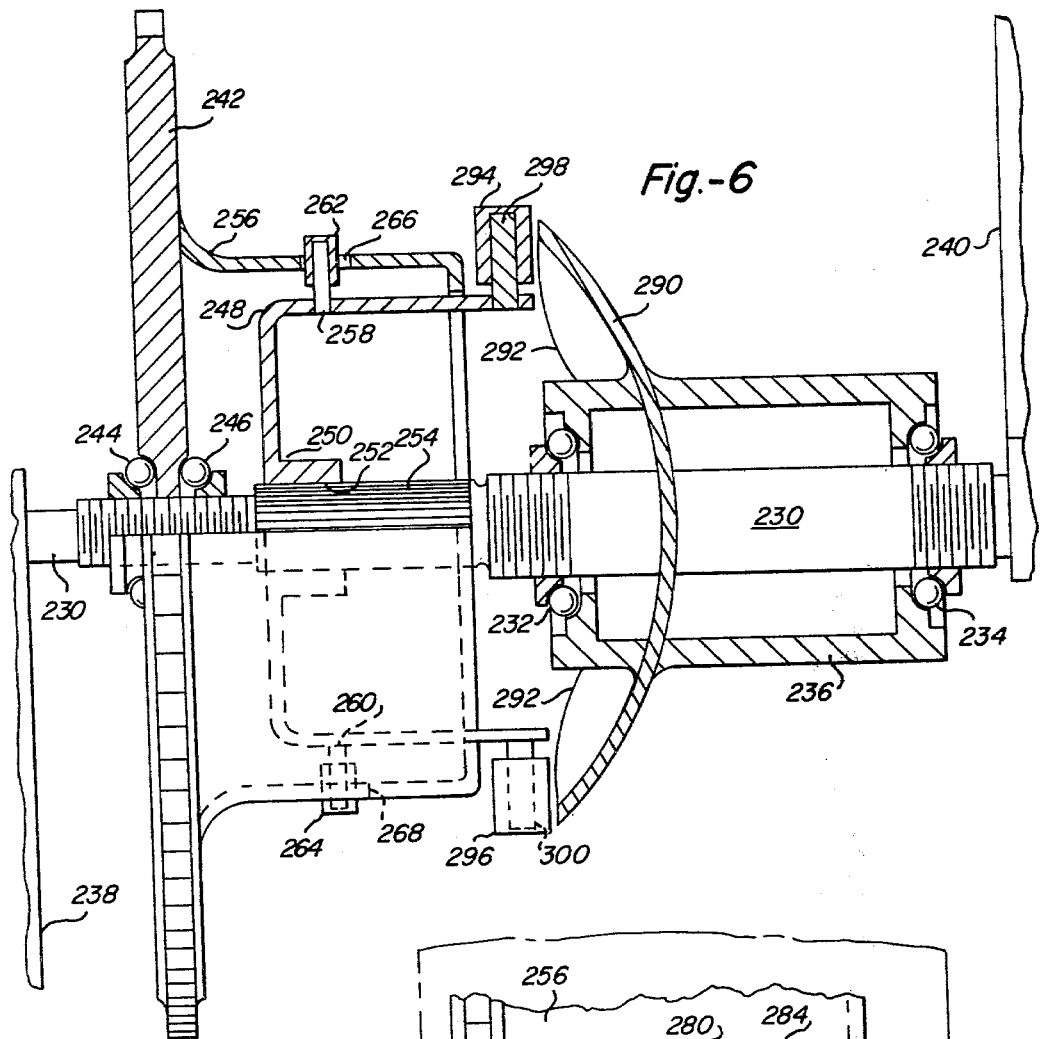
FIG. 6 is a schematic side elevational, partly in cross-section, of a fifth embodiment as mounted on a bicycle.
Figure 7:
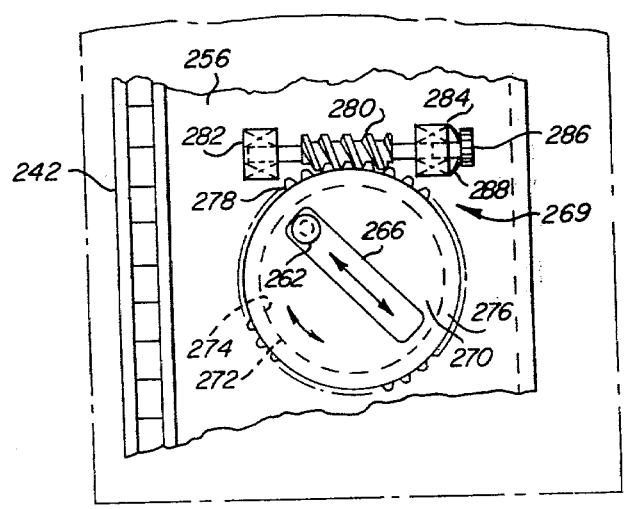
FIG. 7 is partial top view of a modification of the embodiment of FIG. 6.

In the embodiments of FIGS. 6 and 7, the drive system of the present invention comprises a drive shaft means 230, such as a bicycle crank shaft, rotatably mounted by bearing means 232, 234 in a crank hub 236 fixedly attached to a bicycle frame in a conventional manner. Suitable input force applying means, in the form of conventional pedal operated crank arms 238, 240, are suitably conventionally connected to opposite end portions of shaft 230. A chain driving sprocket wheel means 242 is rotatably mounted on one end portion of shaft 230 by bearing means 244, 246.

Input force transfer means are provided by an inner cup shaped member 248 having a hub portion 250 with a splined central bore 252 axially slidably and rotatably drivably mounted on a splined intermediate portion 254 of shaft 230. An outer cup shaped member 256 is fixed to sprocket wheel 242 and telescopically mounted circumjacent inner cup member 248 which is drivably connected thereto by pin members 258, 260 having roller members 262, 264 located in inclined slots 266, 268 which may be located in the periphery of cup 256 as shown in FIG. 6, or in adjustable threaded plug means 269, FIG. 7, by which the angle of inclination of the slots 266, 268 may be selectively varied to selectively change the input-output correlation characteristics of the system to accommodate different conditions of usage such as changes in terrain when riding a bicycle or preferences of a particular rider.

The adjustable plug means 269 comprises a plug member 270 having a stub shaft portion 272 rotatably mounted in a bore 274 in cup member 256 with an enlarged annular head portion 276 at the other end having spiral gear teeth 278 thereon and suitable retaining means (not shown), such as a threaded portion receiving a nut member, on the inner end. A worm gear member 280 is suitably rotatably mounted in bearing blocks 282, 284 affixed to cup member 256 with an adjustment nut 286 and lock washer 288 on one end thereof.

Input-output force correlation means are provided by cam means comprising a cam plate member 290 fixed on hub 236 with a suitably contoured cam surface 292 engageable by cam follower roller members 294, 296 mounted on pin members 298, 300 attached to the cup member 248.

In operation, applied input force is transferred from crank arms 238, 240 to sprocket wheel 242 through shaft 230, the inner cup member 248 via the splined connection between hub portion 250 and shaft portion 254, and the cup member 256 via the roller members 262, 264 and slots 266, 268. The sprocket wheel 242 is rotatably displaceable relative to the input force transfer means during axial relative displacement between cup members 248, 246, enabled by the splined connection therebetween and caused by continuous engagement of rollers 294, 296 with cam suface 292, due to the interaction of rollers 262, 264 in slots 266, 268. The amount of relative rotative movement between sprockets 242 and the input force transfer means is controlled by the contour of cam surface 292 and the angle of inclination and length of slots 266, 268 which are chosen as described in my prior patent. As shown in FIG. 7, the angle of inclination of slots may be selectively adjustable by use of a rotatable plug member 270 which is rotatable by turning worm gear 280.

Sixth Embodiment

In the embodiment of FIGS. 8 and 9, the drive system of the present invention comprises a drive shaft means 300, such as a bicycle crank shaft, rotatably mounted in a crank hub 302 fixedly attached to bicycle frame portions 304 in a conventional manner. Suitable input force applying means, in the form of pedal operated crank arms 306, are suitably conventionally connected to opposite shaft end portions. A chain driving sprocket wheel means 308 is rotatably mounted on one end shaft portion by suitable bearing means 310.

Input force transfer means are provided by an oscillating slider means 312, in the form of a collar member 314 having a central bore 316 slidably mounted on a radially intermediate portion of crank arm 306 and a shaft member 318 suitably fixedly connected thereto. A roller member 320 is mounted on an intermediate portion of shaft 318 and received in a slot 322 in an adjustably rotatable plug member 324 mounted in a bore 326 in an intermediate portion of sprocket wheel 308. One end of plug member 324 is enlarged with spiral gear teeth 328 provided on the periphery thereof and the other end is threaded to receive a retaining nut 330.

A worm gear 332 is suitably mounted on the side surface 334 of sprocket wheell 308 in engagement with gear teeth 328 to enable adjustable rotatable movement of plug member 324 relative to sprocket wheel 308.

Input-output force correlation means are provided by cam means comprising a cam plate member 336 fixed on hub 302 with a suitably contoured cam surface 338 engageable by a cam follower roller means 340 mounted on the end portion of shaft 318.

In operation, applied input force is transferred from the crank arm means 306 to sprocket wheel 308 through slider 314, shaft 318 and roller 320 in slot 322 to drivingly rotate the sprocket wheel on bearing means 310 about shaft axis 340. The sprocket wheel 308 is variably forwardly and rearwardly rotatable displaceable relative to the crank arm and crank shaft in accordance withh the radial positioning of shaft 318 by cam 336 and cam follower 340, the radial variation of the shaft 318 being accommodated by radial inward and outward movement of slider 314 on crank arm 306. The angle of inclination of slot 322 may be selectively varied by manual rotation of worm gear 332 so as to provide selectively adjustable control means for varying the amount and location of the relative rotative displacement of the sprocket during end revolution of the crank arm.

Seventh Embodiment

Figure 10:
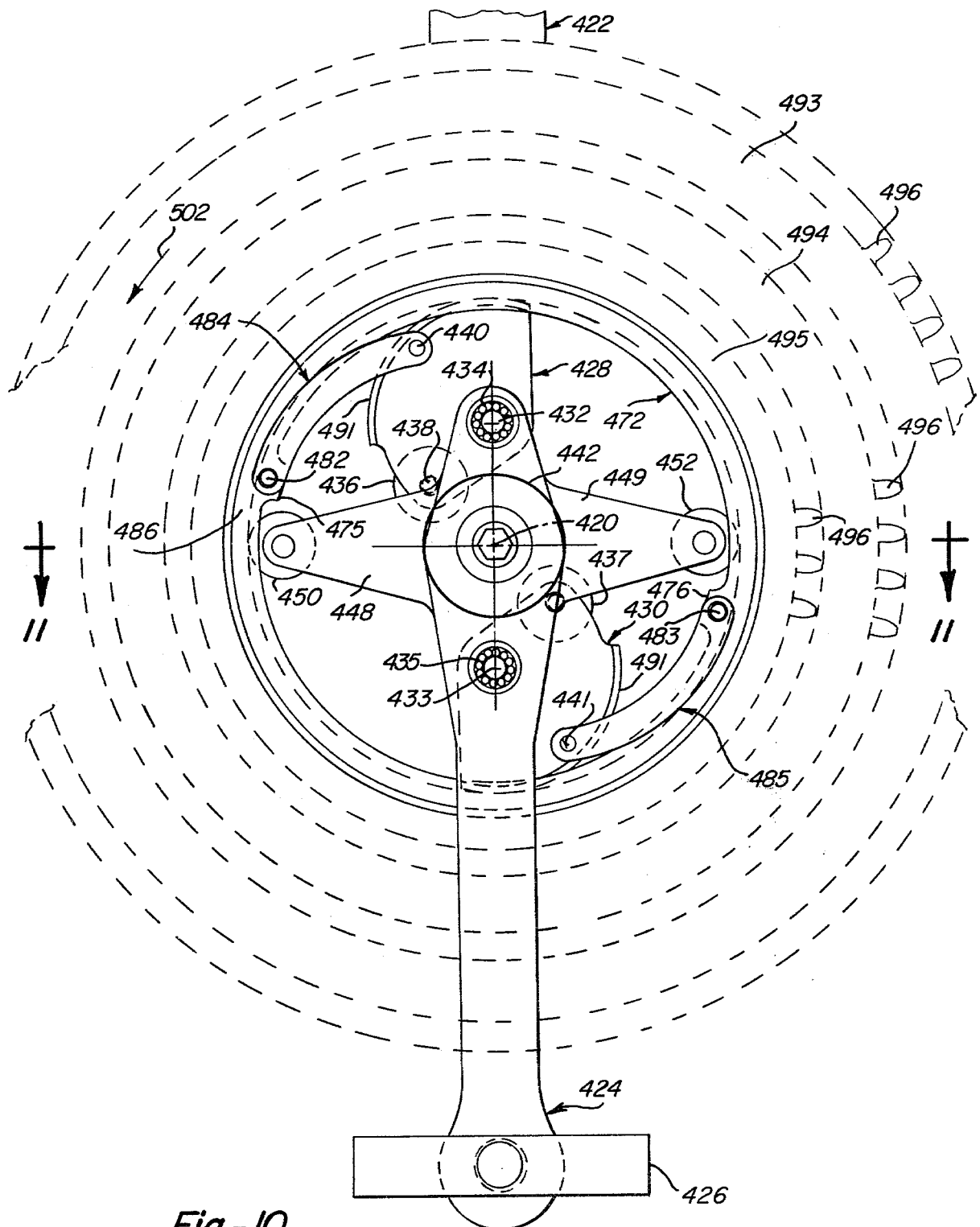
FIG. 10 is a side elevational view of a seventh embodiment.
Figure 11:
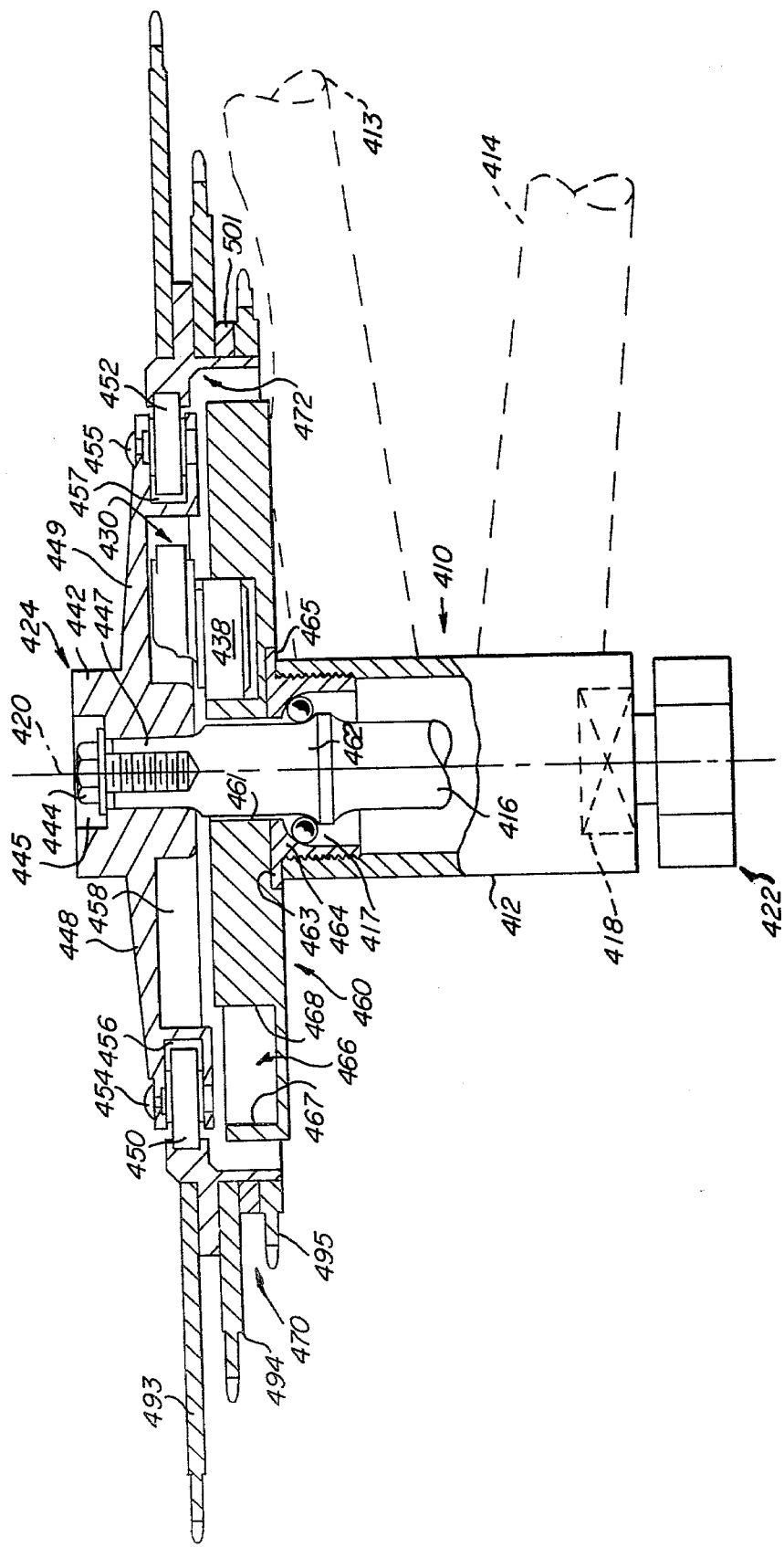
FIG. 11 is a cross-sectional view, with parts removed and broken away, taken along line 11—11 of FIG. 10.

In the seventh embodiment of FIGS. 10-17, the drive system of the present invention is shown in association with a portion of a bicycle 410, FIG. 11, having a crank hub 412 fixedly attached to frame portions 413, 414, in a conventional manner. A crank shaft 416 is rotatably mounted in hub 412 by suitable bearing means 417, 418 in the hub 12 to provide a central axis of rotation 420. A pair of crank arm members 422, 424 are fixed to opposite end portions of crank shaft 416 and extend radially outwardly therefrom in opposite directions in 180° spaced relationship. A pedal 426, FIG. 10, is associated with each crank arm. One of the crank arms 424 has a pair of oscillator means in the form of lever members 428, 430 pivotally attached thereto by pivot pins 432, 433 located equal radial distances outwardly of central axis 420 and rotatably mounted in bearing means 434, 435. Each lever member carries a cam follower roller member 436, 437, rotatably mounted on one side of each lever member by a shaft 438 mounted in a bore 439, FIG. 16, on a radially innermost end portion and a connecting pin member 440, 441 on a radially outwardly located portion.

Figure 12:
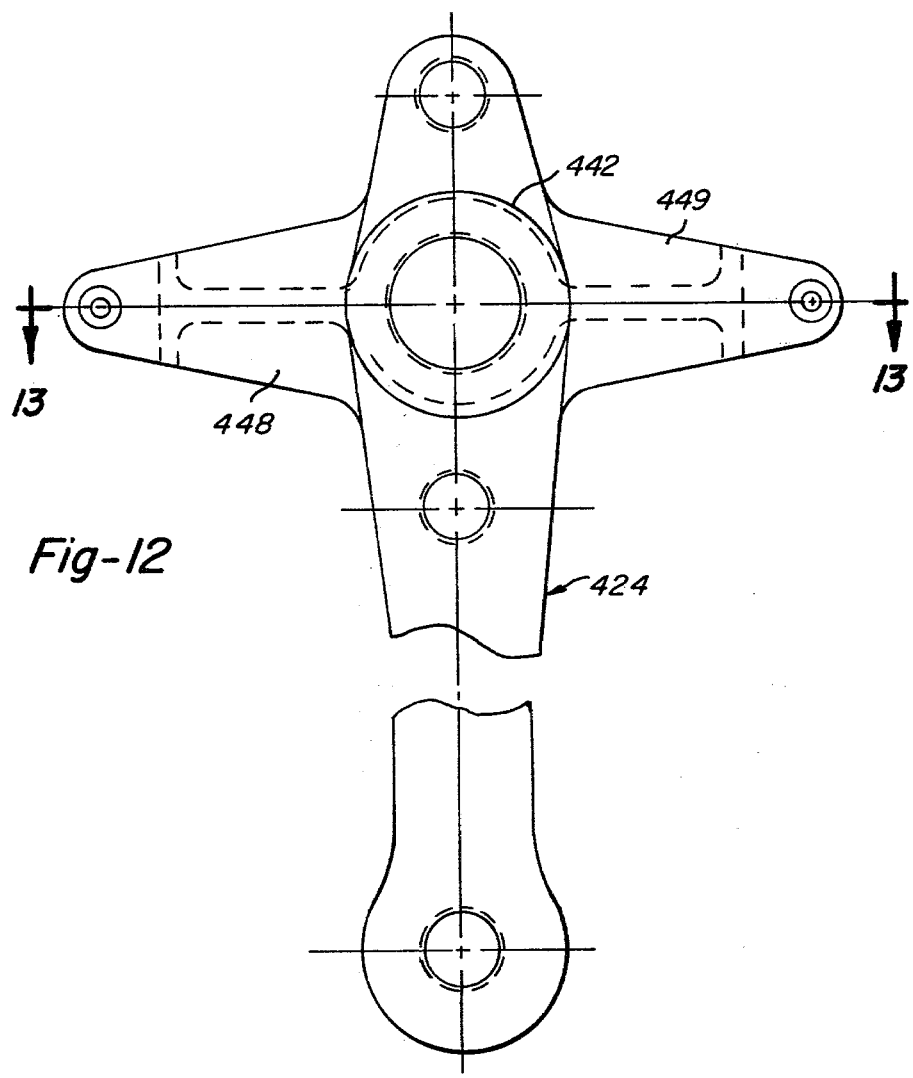
FIG. 12 is a side elevational view of a crank arm of the embodiment of FIG. 10.
Figure 13:
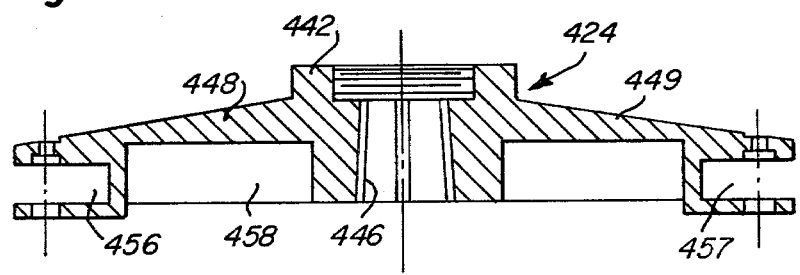
FIG. 13 is a cross-sectional view of the crank arm of FIG. 12 taken along line 13—13.

A mounting means in the form of a hub portion 442, FIGS. 11-13, integral with arm 424 is fixedly removably mounted on one end of shaft 416 by suitable threaded mounting means 444 located in a counterbore 445. Hub portion 442 comprises a central tapered splined bore 446, FIG. 13, which receives a tapered splined end portion 447, FIG. 11, of shaft 416. A pair of oppositely extending support arm portions 448, 449 are integrally connected to and supported by hub portion 442. Roller members 450, 452 are rotatably mounted on bearing pin members 454, 455 in slots 456, 457 at the ends of arm portions 448, 449 in equally radially spaced relationship to central axis 420. An annular cavity 458, FIGS. 11 & 13, circumjacent hub portion 442, accommodates portions of lever members 428, 430.

An annular plate member 460, FIG. 11, having a central bore 461 receiving a cylindrical portion 462 of shaft 416, is suitably fixedly mounted on the end of hub 412 with the end flange portion 463 of a bearing cup member 464 being received in an annular recess 465. A cam track means 466 is defined by symmetrical oppositely facing cam surfaces 467, 468 extending about central axis 420 in plate member 460 for receiving cam follower roller members 436, 437.

Figure 14:
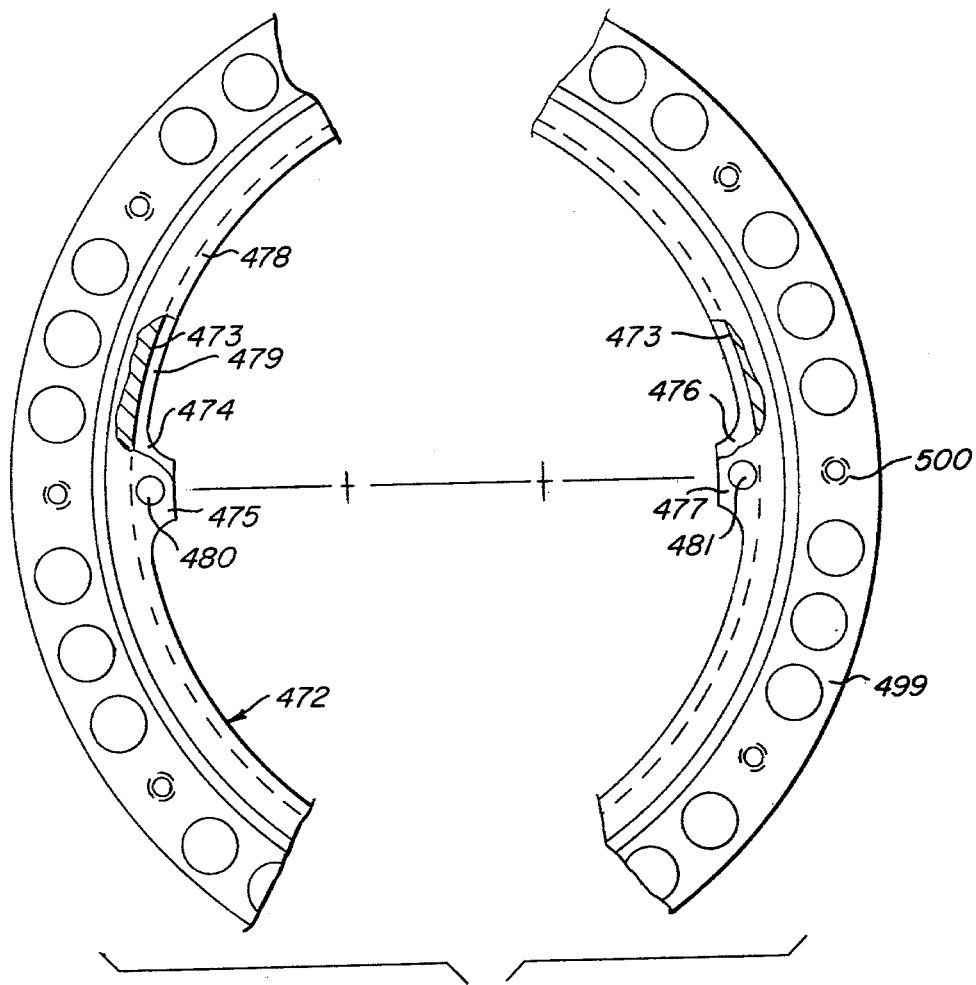
FIG. 14 is a side elevational view, with portions removed, of the sprocket mounting ring member of the embodiment of FIG. 10.
Figure 15:
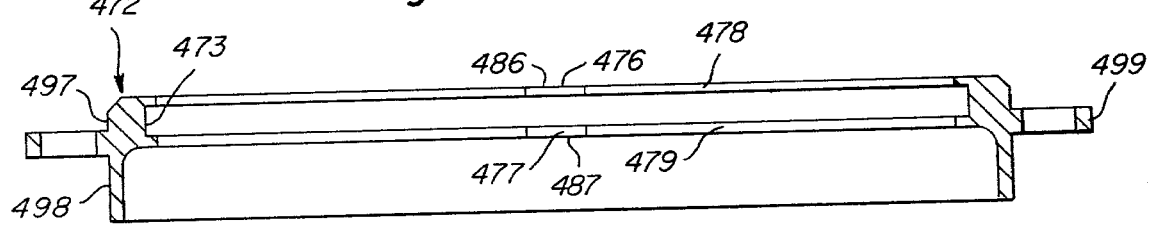
FIG. 15 is a cross-sectional view of the sprocket mounting ring member of FIG. 14.
Figure 16:
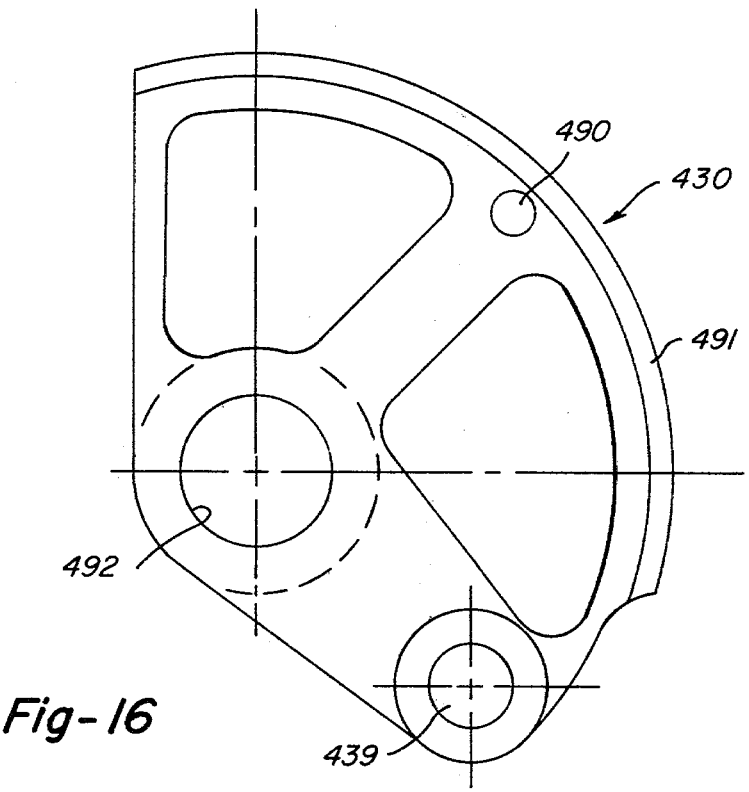
FIG. 16 is a side elevational view of an oscillator member of the embodiment of FIG. 10.
Figure 17:
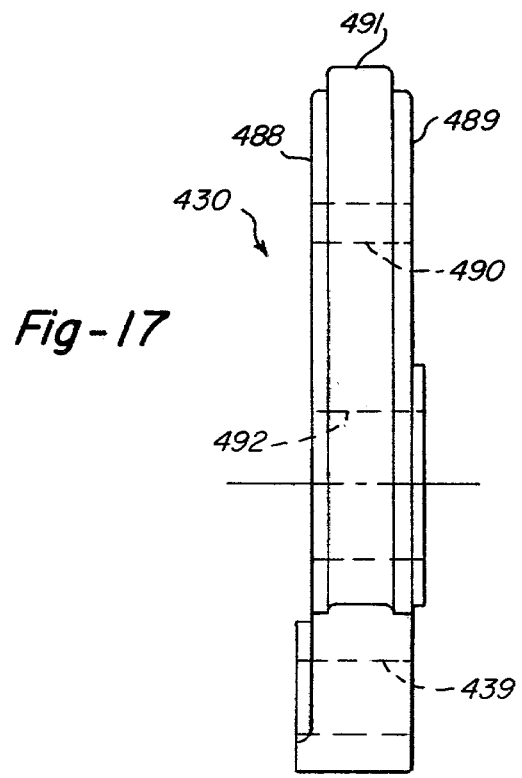
FIG. 17 is another side elevational view of the oscillator member of FIG. 16.

Rotatable output force transfer means 470 in the form of an annular sprocket supporting ring member 472, FIGS. 14 & 15, is rotatably mounted circumjacent the mounting means and cam plate member 460 by roller members 450, 452 which are received in annular groove 473 extending about the inner peripheral surface of member 472. Circumferentially opposite pairs of radially inwardly extending connecting flange portions 474, 475 & 476, 477 on the side walls 478, 479 of ring member 472 having aligned bores 480, 481 which receive pin members 482, 483, FIG. 10, to pivotally connect outer end portions of pairs of link members 484, 485 (only one of each pair being shown) on opposite side surfaces 486, 487, FIG. 15, of ring member side walls 478, 479. The opposite end portions of link members 484, 485 are located adjacent side surfaces 488, 489, FIG. 17, of lever members 428, 430 and pivotally connected thereto by pin members 440, 441 mounted in bores 490. Each of the lever members 428, 430 has an arcuate outer rib portion 491, FIGS. 16 & 17, of equal radius coaxial with bore 492 for pins 432, 433 and dimensioned so as to be received in groove 473 in relatively movable and supportive relationship with the ring member 472.

A plurality of axially spaced chain driving sprocket ring members 493, 494, 495 of varying outer diameter and varying numbers of sprocket teeth 496 are mounted on outer annular surfaces 497, 498, FIG. 15, of ring member 472 and fastened to an annular flange portion 499 by suitable fastening devices (not shown) mounted in bores (not shown) in the sprocket ring members and received in aligned threaded bores 500 in flange portion 499. A spacer ring 501, FIG. 11, may be used to space sprocket rings 494, 495.

In operation, input force is applied to the input force applying means, in the form of the pedals 426, during each 180° downward power stroke of each revolution from the uppermost 0° pedal position to the lowermost 180° pedal position. Input force is similarly applied to the other pedal during the other half of each revolution. Shaft 416, crank arms 422, 424, pins 432, 433, oscillator lever members 428, 430, pins 440, 441, links 484, 485, and pins 482, 483 provide input force transfer means for transferring input force to the sprocket support ring 472 to cause rotation in the direction of arrow 502, FIG. 10, and movement of associated chain. As crank arm 424 is rotated, it carries the oscillators 428, 430 in a circular path about central axis 420 with cam followers 436, 437 moving along the cam track 466 to cause continuous equal pivotal displacement of the oscillators about pins 432, 433. The pivotal oscillation of the oscillators causes circumferential forward and rearward displacement of sprocket supporting ring 472 and sprockets 493, 494, 495 relative to hub 442, supporting arms 448, 449 and the crank arms 422, 424, so as to uniformly change the pedal positions relative to the sprocket members during each revolution whereby to provide input-output force correlating means as described in my prior patent. The symmetrical non-circular contour of the cam track 466 controls the amount and location of the circumferential displacement and is chosen in accordance with predetermined desired input-output force correlation characteristics to be provided in the drive system for particular persons, e.g. men, women or children, and purposes, e.g. racing, touring, transportation, exercise, etc., as described in my prior patent. The drive chain (not shown) may be shifted from sprocket wheel to sprocket wheel by conventional derailleur type shifting means (not shown) and associated with any conventional rear wheel drive apparatus.

Eighth Embodiment

Figure 18:
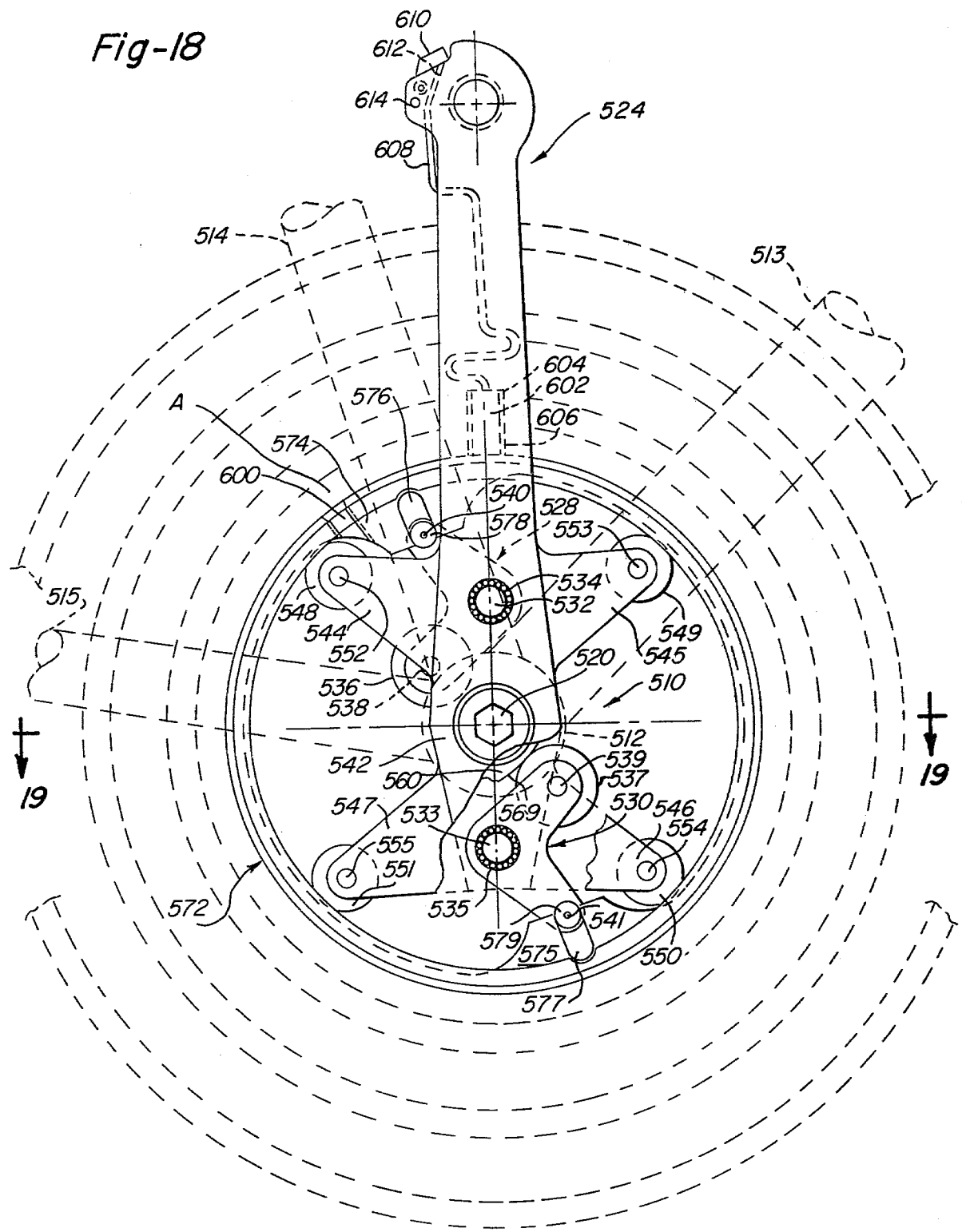
FIG. 18 is a schematic side elevational view, partly in section and with parts removed and/or broken away, of an eighth embodiment.
Figure 19:
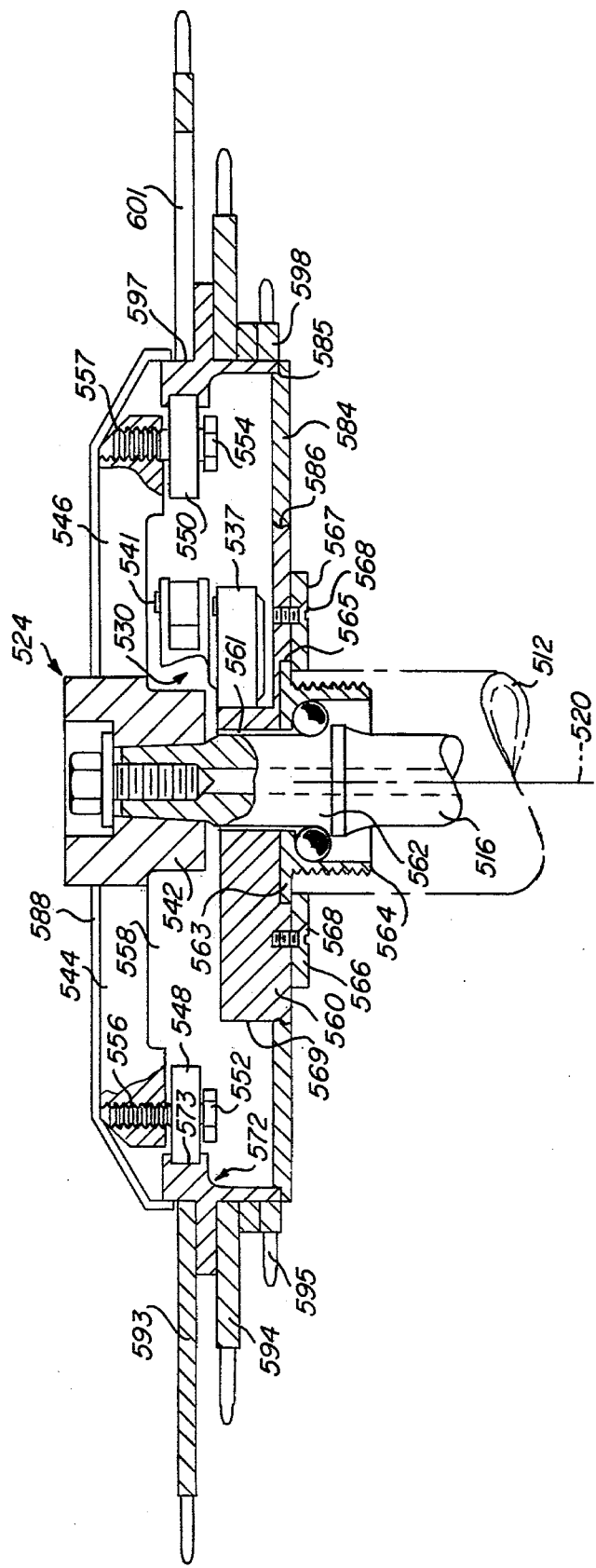
FIG. 19 is an irregular cross-sectional view, with parts transposed, removed and broken away, taken along line 19—19 of FIG. 18.

The eighth embodiment shown in FIGS. 18 & 19, which is a presently preferred embodiment, is a modification of the seventh embodiment wherein the drive system is shown in association with a portion of a bicycle 510 having a crank hub 512 fixedly attached to frame portions 513, 514, 515 in a conventional manner. A crank shaft 516 is rotatably mounted in hub 512 as previously described to provide a central axis of rotation 520 and connected to a pair of crank arm members as previously described. The crank arm member 524 has a pair of oscillator means in the form of oscillatable lever members 528, 530 pivotally attached thereto by pivot bearing pinss 532, 533 located equal radial distances outwardly of central axis 520 and rotatably mounted in bearing means 534, 535. Each lever member carries a cam follower roller member 536, 537 mounted on one side of a radially innermost end portion of the lever members by shafts 538, 539 and a connecting pin member 540, 541 on a radially outwardly located bifurcated portion.

A hub portion 542 integral with arm 524 is fixedly removably mounted on one end of shaft 516 as previously described. The crank arm 524 has four integral outwardly extending arm portions 544, 545, 546, 547 which carry roller members 548, 549, 550, 551 rotatably mounted on threaded bearing pin members 552, 553, 554, 555 received in threaded bores 556, 557, FIG. 19, located in equally radially spaced relationship to central axis 520. An annular cavity 558 circumjacent hub portion 542 accommodates portions of the lever members. A plate member 560, having a central bore 561 receiving a cylindrical portion 562 of shaft 516, is fixedly mounted on the end of hub 512 by a notched end flange portion 563 of a bearing cup member 564 received in a correspondingly notched annular recess 565 in plate member 560 and a pair of segmental mounting plate members 566, 567 which overlap portions of the end flange portions 563 and are fastened to plate member 560 by suitable threaded fastening means 568. A cam track means of the type previously described is defined by the outer peripheral surface 569 of plate member 560 on which cam follower roller means 536, 537 are supported as previously described.

Rotatable output force transfer means comprises an annular sprocket supporting ring member 572 rotatably mounted on roller members 548, 549, 550, 552 which are received in annular groove 573 extending about the inner peripheral surface of member 572 as previously described. Circumferentially opposite pairs of radially inwardly extending flange portions 574, 575, FIG. 18, on the sidewalls of the ring member have aligned radially extending slots 576, 577 which receive roller members 578, 579 carried by pin members 540, 541 mounted on and located between radially outermost bifurcated portions of the lever members 528, 530. An annular cover plate member 584, FIG. 19, having an outer peripheral groove 585 receiving the end portion of member 572, is suitably mounted on an annular peripheral portion 586 of plate member 560. An annular outer cover plate member 588 may be suitably fixedly attached to the crank arm 524 for rotation therewith.

As previously described, a plurality of axially spaced chain driving sprocket ring members 593, 594, 595 of varying diameter and varying numbers of sprocket teeth are suitably fixedly mounted on outer annular surfaces 597, 598 of ring member 572.

Selectively engageable and disengageable locking means, FIG. 18, in the form of a radially extending passage or slot 600 in sprocket ring member 572, which may be located radially opposite an opening 601 in sprocket member 593, and a radially extendable and retractable pin or plate member 602 slidably mounted in a passage or slot 604 in an axially offset portion 606 on the side of crank arm 524 in axial alignment with passage or slot 600 and opening 601, are provided to enable the crank arm 524 to be selectively locked to the sprocket ring member 572. Passage or slot 600 is circumferentially located in a position whereat the oscillator lever members 528, 530 are located in their furthest radially outwardly displaced positions with cam follower roller members 536, 537 located on the furthest radially outwardly located portions of the cam surface 569 so that the roller members do not then follow the cam surface as the sprocket ring member 572 is directly rotated with the crank arms without relative rotative displacement. Member 602 is selectively operable by suitable manually operable control means in the form of a suitably formed wire spring member 608 extending radially outwardly along crank arm 524 to a shift lever member 610 pivotally mounted in a slot 612 on rear side of the crank arm 524 by a pivot pin 614 for manually displaceable movement between pin engaging and disengaging positions.

In operation, input force is applied to the input force applying means, in the form of pedals (not shown) mounted on the outer ends of the crank arms, during each 180° downward power stroke of each revolution of the crank arms from the uppermost 0° pedal position to the lowermost 180° pedal position. Shaft 516, the crank arms, pins 532, 533, oscillator lever members 528, 530, pins 540, 541, and rollers 578, 579 provide input force transfer means for transferring input force to the sprocket support ring 572 to cause rotation in the direction of arrow 616 and movement of associated chain. As crank arm 524 is rotated, it carries the oscillators 528, 530 in a circular path about central axis 520 with cam followers 536, 537 moving along the cam track 569 to cause continuous equal pivotal displacement of the oscillators about pins 532, 533 and arcuate oscillating movement of rollers 578, 579 in slots 576, 677. The pivotal oscillation of the oscillators causes circumferential forward and rearward displacement of sprocket supporting ring 572 and sprockets 593, 594, 595 relative to hub 542, supporting arms 544, 545, 546, 547 and the crank arms so as to change the pedal positions relative to the sprocket members 593, 594, 595 during each revolution whereby to provide cam controlled input-output force correlating means. The symmetrical non-circular contour of the cam track surface 569 controls the amount and location of the circumferential displacement and is chosen in accordance with predetermined desired input-output force correlation characteristics to be provided in the drive system for particular persons and for purposes. The drive chain (not shown) may be shifted from sprocket wheel to sprocket wheel by conventional derailleur type shifting means (not shown) and associated with any conventional rear wheel drive apparatus.

If it is desired to operate the drive system in a conventional manner, i.e. without utilization of the input-output force correlation means, the slidable locking means 602 may be radially inwardly displaced relative to the crank arm 524 from a radially outermost disengaged position (shown in FIG. 18) to a radially innermost engaged position (not shown) within the locking slot means 600 provided in sprocket ring member 572 whenever the slidable locking means 602 becomes aligned with the locking slot means 600 during movement of the crank arm 524 relative to the sprocket ring member 572. The slidable locking means 602 is manually operable by control means in the form of the suitably formed spring wire 608 which is suitably connected to the slidable locking means and a control lever 610 suitably mounted on the radially outermost end portion of crank arm 524.

When the slidable locking means 602 is located in the locking slot means 600, sprocket ring member is fixed relative to the crank arm 524 and relative circumferential displacement therebetween is precluded. The construction and arrangement is such that, in the locked position, the cam follower roller members 536, 637 are located on the radially outermost portions of cam surface 569 with roller members 578, 579 located in radially outermost positions in slots 576, 577. Thus, with sprocket ring member 572 fixed to crank arm 524 by the locking means, the oscillator lever members are held in the radially outermost positions by prevention of radial movement of roller members 578, 579 in slots 576, 577 and cam follower roller members 536, 537 are held in radially outwardly displaced position relative to the portions of the cam surface 569 which are located radially inwardly of the radially outermost portions thereof. The locking means is useful in situations, such as while pedalling uphill, where the bicycle rider may desire to utilize a conventional bicycle drive system for his own comfort or convenience or to accommodate his own particular pedalling style.

It is to be understood that, while the inventive concepts have particular advantages in use with bicycle drive systems, they are applicable to other kinds of velocipeds and to drive systems for other vehicles, such as automobiles and trucks, and machinery of various kinds. Thus, it is intended that the appended claims be construed to include alternative embodiments, modifications and uses except insofar as limited by the prior art.

What is claimed is:

1. A drive system for driving a driven device such as the rear wheel of a bicycle or a flywheel or the like comprising;

input force applying means for applying force to the drive system;

rotatable output force transfer means for transferring output force to the driven device;

mounting means for rotatably mounting said rotatable output force transfer means and enabling rotation thereof relative to said mounting means in both forward and rearward directions;

input force transfer means for transferring input force from said input force applying means to said rotatable output force transfer means to cause rotation thereof in the forward direction and transfer of output force to the driven device;

input-output force correlation means operatively associated with said input force transfer means for correlating input-output forces by forward and rearward relative rotative displacement of said rotatable output force transfer means and said input force transfer means during each revolution of the drive system; and locking means operatively associated with said drive system and being movable between a locked position and an unlocked position relative thereto for selectively disabling and enabling said input-output force correlation means relative to said rotatable output force transfer means.

2. The invention as defined in claim 1 and wherein:

the position of said rotatable output force transfer means relative to said input force applying means and said input force transfer means being continuously variable by said input-output force correlation means during each revolution of the drive system when said locking means is in the unlocked position; and the position of said rotatable output force transfer means relative to said input force applying means and said input force transfer means being fixed and said input-output force condition means being disabled during each revolution of the drive system when said locking means is in the locked position.

3. The invention as defined in claim 2 and wherein said locking means comprising:

remote control means for selectively moving said locking pin means between the locked position and the unlocked position.

4. The invention as defined in claim 1 and wherein said input-output force correlation means comprising:
cam means mounted in juxtaposition to and operative relationship with said rotatable output force transfer means and said input force transfer means for controlling the amount and location of the relative rotative displacement therebetween during each revolution of the drive system.

5. The invention as defined in claim 4 and wherein said cam means comprising:
cam surface means mounted circumjacent the axis of rotation of said rotatable output force transfer means; and
cam follower means operatively associated with said cam surface means during each revolution of the drive system.

6. The invention as defined in claim 5 and wherein said input-output force correlating means further comprising:
oscillator means being operatively connected to said cam follower means and to said rotatable output force transfer means for causing relative rotative displacement of said rotatable output force transfer means.

7. The invention as defined in claim 6 and wherein:
said oscillator means being connected to and movable with said input force transfer means for continuous movement therewith along a circular path during each revolution of the drive system.

8. The invention as defined in claim 7 and wherein:
there being a pair of said cam follower means and said oscillator means spaced 180° from one another.

9. The invention as defined in claim 8 and wherein each of said oscillator means comprising:
pivotal connecting means for connecting a mid portion of said oscillator means to said input force transfer means;
first pin means for connecting one end portion of said oscillator means to said cam follower means for causing pivotal movement of said oscillator means; and
second pin means for connecting the other end portion of said oscillating means to said rotatable output force transfer means for causing rotative displacement thereof.

10. The invention as defined in claim 9 and wherein said input force transfer means comprising:
a pair of pedal operated crank arm members extending in opposite directions in 180° spaced relationship about the central axis of rotation of said rotatable output force transfer means;
a crank shaft mounted in coaxial relationship with said rotatable output force transfer means and mounting and connecting said crank arm members;
one of said crank arm members having a mid portion connected to said crank shaft and an end portion extending radially beyond said crank shaft in parallel axially spaced relationship with the other of said crank arm members;
one of said oscillator members being mounted on said end portion of said one of said crank arm members on one side of the crank shaft member; and
the other of said oscillator members being mounted on said one of said crank arm members on the radially opposite side of the crank shaft member.

11. The invention as defined in claim 10 and further comprising:
hub means mounted on the frame of the bicycle for rotatably supporting said crankshaft member;
an annular plate member fixedly mounted on one end of said hub means axially next adjacent said one of said crank arm members;
said cam surface means being located on a peripheral surface of said plate member; and
said oscillator members being located between said plate member and said one of said crank arm members.

12. The invention as defined in claim 11 and wherein said mounting means comprising:
a plurality of circumferentially spaced roller means mounted on said one of said crank arm members for rotative movement therewith.

13. The invention as defined in claim 12 and wherein said rotatable output force transfer means comprising:
a sprocket ring means having an annular inner peripheral surface for supportive engagement with said circumferentially spaced roller means.

14. The invention as defined in claim 13 and wherein said rotatable output force transfer means further comprising:
a plurality of sprocket members fixedly mounted on and being rotatable with said sprocket ring means.

15. The invention as defined in claim 14 and wherein said sprocket ring means further comprising:
axially spaced radially inwardly extending side wall portions located on opposite sides of said annular inner peripheral surface; and
said circumferentially spaced roller means being located between said side wall portions.

16. The invention as defined in claim 15 and wherein said sprocket ring means further comprising:
a pair of circumferentially opposite slot means located on said side wall portions for receiving said second pin means.

17. The invention as defined in claim 16 and wherein each of said oscillator means further comprising:
a roller member mounted on said second pin means and being mounted in slot means.

18. The invention as defined in claim 17 and wherein each of said oscillator means comprising:
an L-shape lever member having a pair of arm portions connected by a central portion;
said pivotal connecting means being located in said central portion;
one of said pair of arm portions extending radially outwardly from said central portion toward said sprocket ring means and said second pin means being located at the radially outermost end portion thereof;
the other of said pair of arm portions extending radially inwardly from said central portion toward said cam surface means and said first pin means being located at the radially innermost end portion thereof.

19. The invention as defined in claim 18 and wherein:
said cam surface means being positioned axially outwardly offset from and located next adjacent said hub means;
said annular inner peripheral surface of said sprocket ring means being axially outwardly offset relative to and located axially next adjacent said cam surface means; and said one of said crank arms being axially outwardly offset relative to and located axially next adjacent said annular inner peripheral surface of said sprocket ring means.

20. The invention as defined in claim 19 and wherein: said L-shape lever member being located in axial alignment with annular inner peripheral surface of said sprocket ring means.

21. The invention as defined in claim 20 and wherein said cam follower means comprising:
   a roller member mounted on one side of L-shape lever member in axially inwardly offset relationship thereto and in axial alignment with said surface means.

22. The invention as defined in claim 21 and wherein said locking means comprising:
   a slidable pin means mounted on a radially inner portion of said one of said crank arm members in axial alignment with said sprocket ring means for radial inward and outward movement relative to said sprocket ring means between a radially outer disengaged portion and a radially inner engaged position relative thereto; and
   a control means mounted on said one of said crank arm means for selectively actuating said slidable pin means.

23. The invention as defined in claim 22 and wherein said control means comprising:
   a control element mounted on said one of said crank arm members and having a radially innermost end portion operatively connected to said slidable pin means and extending radially outwardly toward the radially outermost end portion of said one of said crank arm members; and
   a manually operable actuating member mounted on the radially outermost end portion of said one of said crank arm members and being operably connected to a radially outermost end portion of said control element.

24. The invention as defined in claim 2 and further comprising:
   lost motion means between said rotatable output force transfer means and said input-output force correlation means for enabling non-operating movement of said input-output force correlation means relative to said rotatable output force transfer means in said locked position.

25. The invention as defined in claim 24 and wherein said lost motion means further comprising:
   pin means on one of said rotatable output force transfer means and said input-output force correlation means for transfer of force therebetween in the unlocked position to change the position of said rotatable output force transfer means relative to said input-output force correlation means; and slot means on the other one of said rotatable output force transfer means and said input-output force correlation means for receiving said pin means and enabling transfer of force therebetween in the unlocked position and enabling movement of said pin means relative to said slot means in the locked position without changing the position of said rotatable output force transfer means relative to said input-output force correlation means.

26. The invention as defined in claim 24 and wherein said locking means further comprising:
   a pin means being selectively operable for axially displaceable sliding movement to and from said locked position and said unlocked position; and
   a slot means for receiving said pin means in said locked position.

27. The invention as defined in claim 26 and wherein: said pin means being associated with said input force applying means; and
   said slot means being associated with said rotatable output force transfer means.

28. The invention as defined in any of claims 1 through 12 or 24 through 27 and wherein said rotatable output force transfer means comprising:
   a plurality of axially spaced chain driving sprocket means of varying diameter with varying numbers of sprocket teeth for providing variable gear ratios for the drive system.

* * * * *